United States Patent
Starchuk et al.

(10) Patent No.: US 11,881,365 B2
(45) Date of Patent: Jan. 23, 2024

(54) WIRELESS SWITCH ASSEMBLY

(71) Applicant: Levven Electronics Ltd., Edmonton (CA)

(72) Inventors: Nathan Starchuk, Edmonton (CA); Jonathan DeMong, Beaumont (CA); Todd Phelps, Edmonton (CA)

(73) Assignee: LEVVEN ELECTRONICS LTD., Edmonton (CA)

( * ) Notice: Subject to any disclaimer, the term of this patent is extended or adjusted under 35 U.S.C. 154(b) by 0 days.

(21) Appl. No.: 17/395,085

(22) Filed: Aug. 5, 2021

(65) Prior Publication Data
US 2023/0039228 A1    Feb. 9, 2023

(51) Int. Cl.
| | | |
|---|---|---|
| H01H 23/12 | (2006.01) | |
| H01H 23/04 | (2006.01) | |
| H01H 23/24 | (2006.01) | |

(52) U.S. Cl.
CPC ............ *H01H 23/12* (2013.01); *H01H 23/04* (2013.01); *H01H 23/24* (2013.01)

(58) Field of Classification Search
CPC .... H01H 23/143; H01H 23/30; H01H 23/025; H01H 2300/03; H01H 23/145; H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

| | | | |
|---|---|---|---|
| 5,637,930 A | 6/1997 | Rowen et al. | |
| 5,909,087 A | 6/1999 | Bryde et al. | |
| 6,380,696 B1 | 4/2002 | Sembhi et al. | |
| 6,459,938 B1 | 10/2002 | Ito et al. | |

(Continued)

FOREIGN PATENT DOCUMENTS

| | | |
|---|---|---|
| DE | 3714382 A1 | 5/1987 |
| EP | 2582208 A2 | 4/2013 |
| WO | 2012109696 A1 | 8/2012 |

OTHER PUBLICATIONS

International Search Report and Written Opinion dated Aug. 19, 2015 from PCT/CA2015/050487, 9 pgs.
Examiner Report dated Jul. 20, 2020 from CA2853378, 6 pgs.

*Primary Examiner* — Ahmed M Saeed
(74) *Attorney, Agent, or Firm* — Jenna L. Wilson; Wilson Lue LLP

(57) ABSTRACT

An assembly for a wall-mounted or surface-mounted switch comprises a housing, a shell, and circuitry board. The housing comprises a base and a sidewall defining an interior space, a resilient arm projecting from the base into the interior space. The shell has a sidewall and is mounted to the housing to enclose the interior space. The interior of the shell includes a switch contact surface. The circuitry includes a switch such as a tactile or linear switch. The shell is movable from a disengaged position to an actuating position in response to force applied to the exterior of the shell. Applied force causes the switch contact surface to actuate the switch and the shell to deflect the resilient arm. When the applied force is removed, the resilient arm returns the shell to a neutral position.

20 Claims, 6 Drawing Sheets

(56) References Cited

U.S. PATENT DOCUMENTS

| | | | |
|---|---|---|---|
| 7,498,952 B2 | 3/2009 | Newman, Jr. | |
| 7,573,208 B2 | 8/2009 | Newman, Jr. | |
| 7,592,967 B2 | 9/2009 | Mosebrook et al. | |
| 7,656,308 B2 | 2/2010 | Atkins | |
| 7,839,017 B2 | 11/2010 | Huizenga et al. | |
| 8,289,716 B2 | 10/2012 | Patel et al. | |
| 10,276,328 B1 * | 4/2019 | Cheng ................ | H01H 13/7065 |
| D864,879 S | 10/2019 | Keirstead | |
| 11,073,925 B1 * | 7/2021 | McClain ................ | G06F 3/0488 |
| 2006/0000971 A1 | 1/2006 | Jones et al. | |
| 2008/0111491 A1 | 5/2008 | Spira | |
| 2009/0102679 A1 | 4/2009 | Schoettle | |
| 2010/0214756 A1 | 8/2010 | Feldstein et al. | |
| 2013/0020961 A1 | 1/2013 | Lin | |
| 2013/0076270 A1 | 3/2013 | Alexandrovich et al. | |
| 2014/0132475 A1 | 5/2014 | Bhutani et al. | |
| 2014/0252883 A1 * | 9/2014 | Dinh ..................... | H01H 13/06 |
| | | | 29/622 |
| 2015/0357133 A1 * | 12/2015 | Keirstead ............... | H01H 23/04 |
| | | | 200/339 |
| 2018/0218859 A1 * | 8/2018 | Ligtenberg ............. | H01H 13/86 |

* cited by examiner

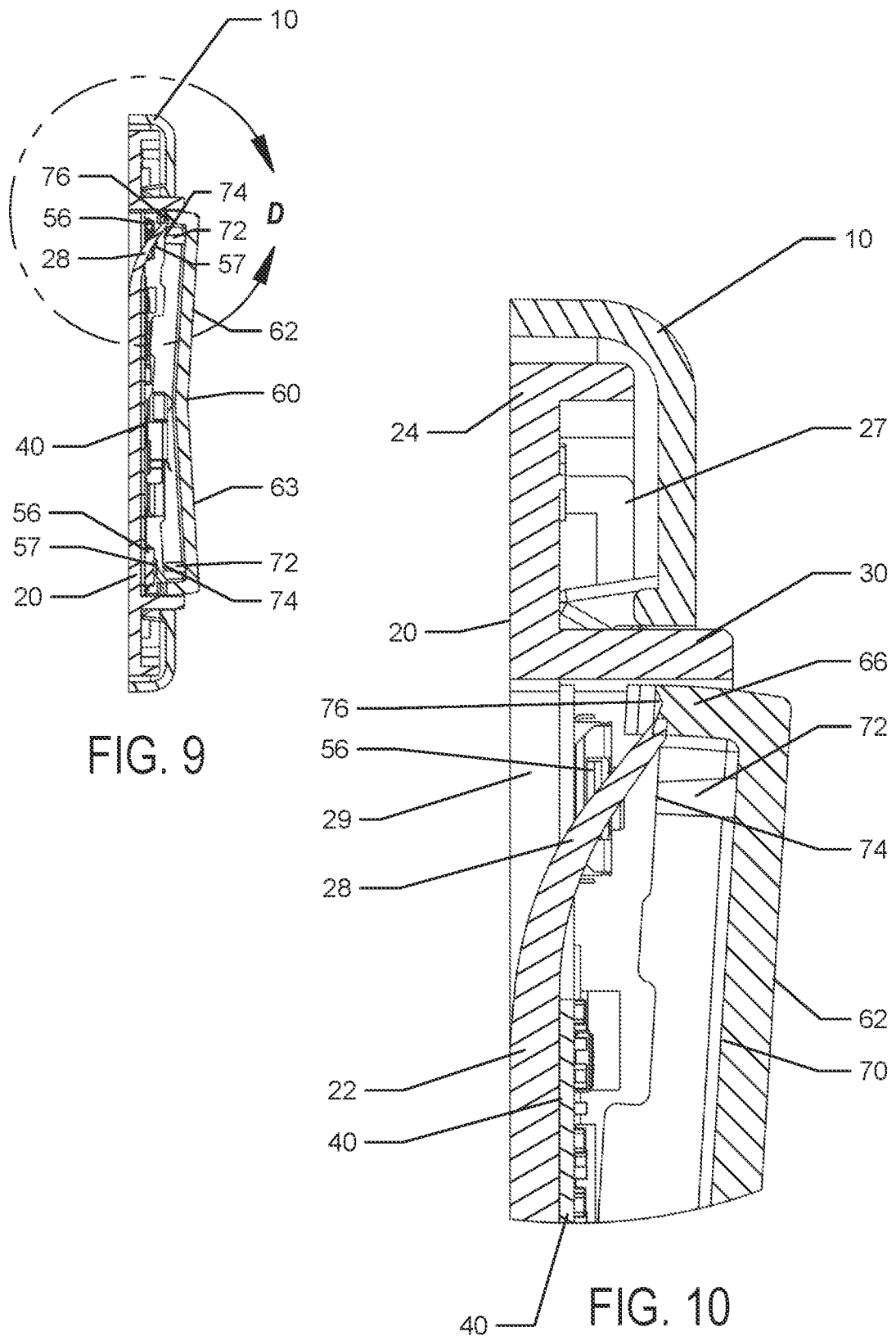

WIRELESS SWITCH ASSEMBLY

TECHNICAL FIELD

This disclosure relates to a switch assembly for use in controlling electrical fixtures in a building structure.

TECHNICAL BACKGROUND

In both residential and commercial buildings, wireless control of electrical fixtures and appliances, such as light fixtures, has gained popularity due to its advantages over hardwired control of fixtures and appliances. For example, wireless light switch systems that employ a wireless control device that sends radiofrequency (RF) commands to a receiver controlling a light fixture do not necessarily require that both the wireless control and the corresponding load be connected to the same circuit, unlike a traditional wired light switch and load.

Wireless switch assemblies are generally more expensive to manufacture than a conventional wired slight switch; a wireless switch may require elements such as power source interfaces, transmitters or transceivers, antennas, microprocessors and memory to be able to pair with a fixture's load controller, and to send commands to control that load controller. The wireless switch may also include its own battery as a power source. Additionally, it may be desirable to provide a wireless switch with a similar appearance to a conventional wired switch, since conventional wired switches are easily recognized and operated by users.

BRIEF DESCRIPTION OF THE DRAWINGS

The accompanying drawings illustrate, by way of example only, embodiments of the present invention. In the accompanying drawings, like reference numerals describe similar items throughout the various figures.

FIG. 9 is a cross-sectional view of the switch assembly and switch plate shown in FIG. 8.

FIG. 10 is an enlarged view of a portion of the cross-sectional view of FIG. 9.

DETAILED DESCRIPTION OF THE INVENTION

A self-powered wireless switch assembly is generally easier and less expensive to install than a conventional wired switch, since it does not require an electrical connection and can be mounted in any convenient location. On the other hand, a wireless switch is more expensive to manufacture than a conventional wired switch because the wireless switch circuitry must include a transmitter or transceiver, microprocessor, antenna, switch(es) and battery power supply. Additional components not typically found in conventional wired switches may be required as well. For example, the mechanical interface (button, rocker, dimmer etc.) of the wireless switch assembly must actuate the switch on the circuit board. This is typically accomplished using a spring component that moves under force applied by mechanical interface to contact the corresponding switch on the circuit board. This contributes to the cost of manufacture, both because of the requirement for additional parts, and because the switch and the spring component must be aligned properly when the switch assembly is manufactured to ensure proper operation after installation.

Accordingly, the embodiments described herein provide an improved switch assemblies, typically used to wirelessly communicate with a load controller to control fixtures or appliances in a residential or commercial structure. These switch assemblies may comprise self-powered rocker, dimmer (dial or slider), push-button, or a similar devices with a low profile capable of being mounted on a wall or other flat surface without the need for a cut-out or electrical box behind the switch assembly. The switch assemblies described below are sized to fit under a wall switch plate or faceplate. In response to actuation of the rocker switch or other control mechanism, a radiofrequency (RF) signal is generated and transmitted to a corresponding load controller. An example of a wireless switch assembly, load controller, and their operation is provided in U.S. Pat. No. 9,401,252 entitled "Wireless light switch system and method, remote switch device, and load controller device", the entirety of which is incorporated herein by reference.

Figure 1:
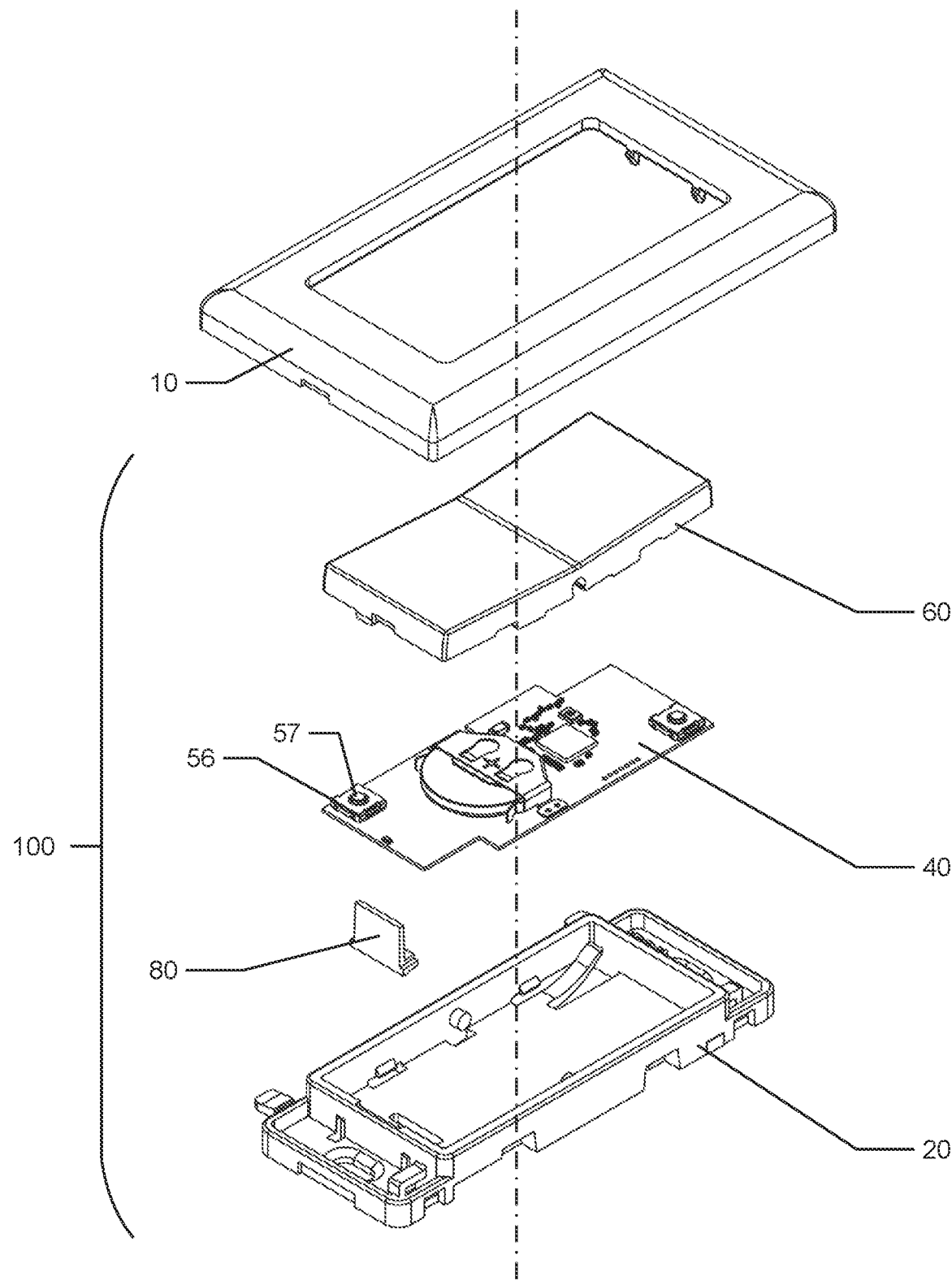
FIG. 1 is an exploded view of an example switch assembly and a switch plate in accordance with the examples described below.

An entire switch assembly 100 is shown in FIG. 1, together with an example switch plate 10 that may be used in combination with the switch assembly. Briefly, the switch assembly 100 comprises a housing 20 and a shell 60. Together, the housing 20 and shell 60 enclose the switch circuitry, which may be provided on printed circuit board (PCB) 40. The housing 20 and shell 60 may be manufactured from any suitable material for a switch assembly, and optionally the same material as the switch plate 10. Typical materials for a light switch assembly include polymers such as acrylonitrile butadiene styrene (ABS). For typical uses of the switch assembly, it may be preferred to use a fire-retardant material.

Figure 8:
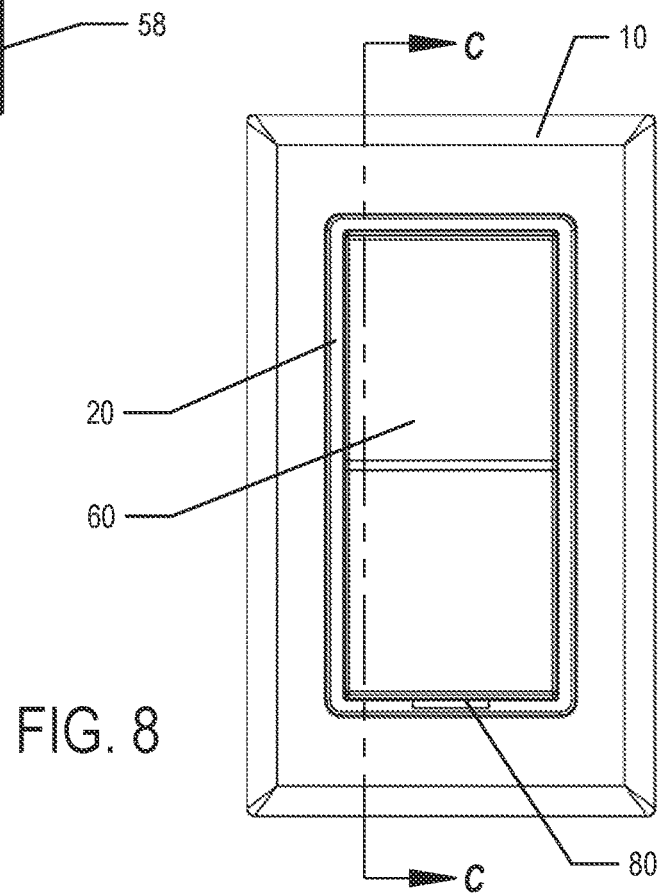
FIG. 8 is a front view of the example switch assembly and the switch plate of FIG. 1, when assembled.

In the illustrated examples, the switch assembly 100 is a rocker switch assembly, commonly used in residential and commercial construction. The shell 60 is therefore configured to pivot slightly around an axis to provide a "rocking" motion when the switch is actuated to turn on or off the fixture controlled by the switch. However, those skilled in the art will understand that the switch assembly need not be a rocker switch assembly. Optionally, a light pipe 80 may be mounted in the housing 20 to transmit light from a light-emitting diode (LED) on the circuit board 40. The light pipe 80 is formed of a suitable light transmitting or diffusing material such as acrylic or polycarbonate. When assembled together with the switch plate 10, the switch assembly 100 provides an appearance similar to a conventional wall-mounted light switch, as can be seen in FIG. 8.

The housing 20 is shown in more detail in FIGS. 2-5. An interior space is defined by a sidewall 30 projecting from a base 22. The sidewall 30 defines a generally rectangular shape, and the switch circuitry is retained within this interior space. The base 22 extends between first and second ends 24, each of which may project beyond the perimeter of the sidewall 30. The rear of the housing 20 defines a planar surface that is easily mounted onto a wall or other planar surface.

The first and second ends 24 may be configured with mounting or assembly features for mounting the switch assembly 100 on a wall or other surface, and connecting multiple switch assemblies 100 together in a multi-gang switch arrangement. In the illustrated example, the first and second ends 24 include apertures or bores 25, optionally countersunk. The housing 20 and/or entire switch assembly 100 may be mounted on the surface by screws or other fasteners via these apertures or bores 25. The same fasteners may also attach a switch plate 10 mounted over the switch assembly 100. However, other means may be used to mount the switch assembly 100 on a surface. For example, a rear surface of the housing 20 may be attached to the surface with an adhesive.

The sides of the housing 20 may be provided with mating attachments to connect two or more switch assemblies 100 side-by-side. In the illustrated examples, these mating attachments are provided on the first and second ends 24, although they need not be positioned near the ends. One side of each end 24 is provided with a notched cantilevered beam 26, and the opposite side of each end 24 is provided with a corresponding ledge 27 under which the beam 26 may be inserted. With these mating attachments, two, three, four, or more switch assemblies 100 may be connected to each other. A corresponding multi-gang switch plate 10 can be provided to fit over the connected switch assemblies 100.

One or more tabs 32 may be provided on the inner surface of the sidewall 30 to retain the circuit board 40 in place. In the rocker switch example that is illustrated, posts or lugs 34 also extend from the inner surface of the sidewall 30 at the midpoint of each lateral portion of the sidewall 30. These posts 34 provide a pivot point for the shell 60.

Figure 3:
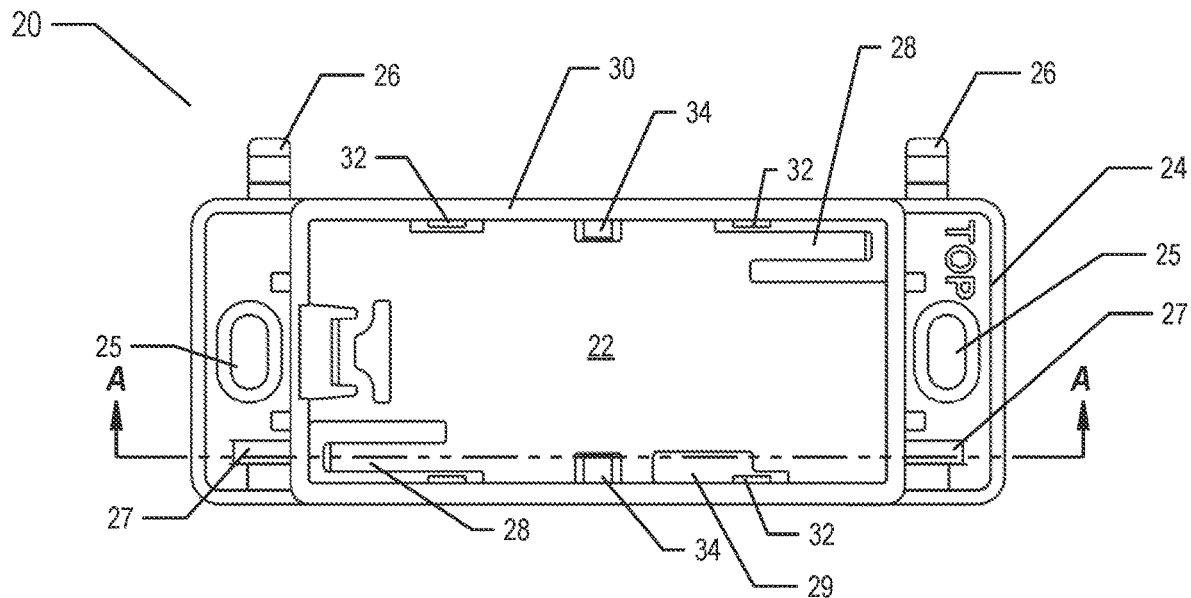
FIG. 3 is a top plan view of the housing of FIG. 2.
Figure 4:
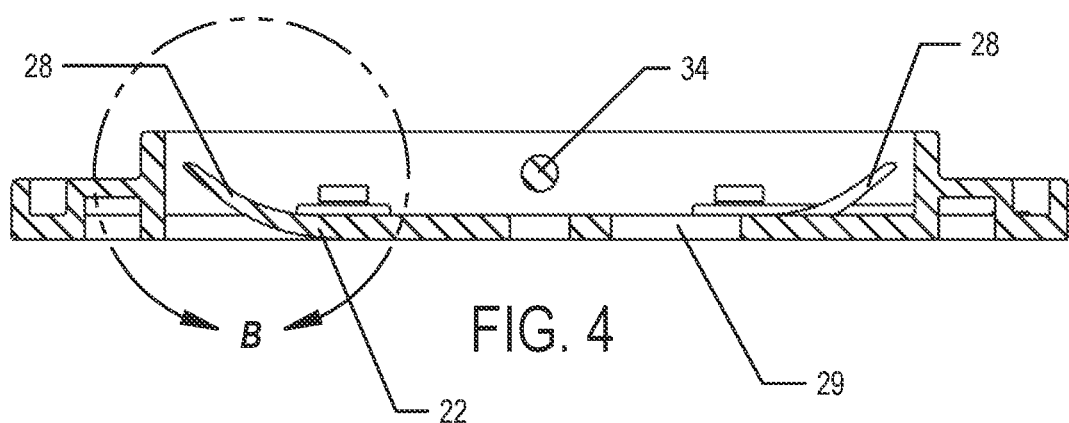
FIG. 4 is a cross-sectional view of the housing of FIG. 2.
Figure 5:
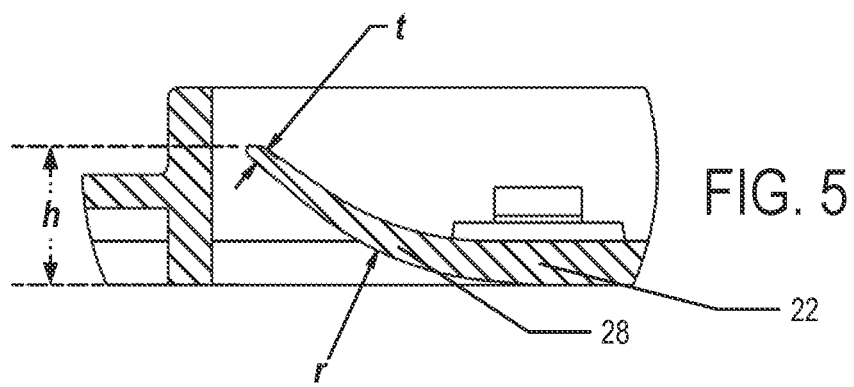
FIG. 5 is an enlarged view of a portion of the cross-sectional view of FIG. 4.

Additionally, a pair of resilient arms 28 protrude into the interior space, as best seen in the plan view FIG. 3, and the cross-sectional view in FIG. 4. The resilient arms 28 are preferably formed as part of a unitary housing 20 and incline upwards into the interior space. As shown in the illustrated example, the resilient arms 28 are each proximate to one of the lateral portions of the sidewall 30, and extends toward an end 24 of the housing 20, terminating near a transverse portion of the sidewall 30. As will be better appreciated from the schematic of the circuit board 40 in FIG. 7, positioning the resilient arm 28 near a corner of the housing 20 maximizes the usable space on the circuit board 40, but the resilient arm location may vary from the illustrated example according to the design of the circuit board 40 and/or the type of shell 60 (e.g., rocker, push-button, etc.). The dimensions and curvature of the resilient arms 28 are preferably selected to optimize deflection, while minimizing fatigue due to stress on the arm. FIG. 4 is a cross-section of the plan view of FIG. 3, taken along the plane A-A, and FIG. 5 is an enlargement of the region B in FIG. 4. As can be seen in these figures, to optimize performance of the resilient arm, the thickness of the arm decreases from the point where it separates from the main body of the base 22 to its tip. In one example, the thickness of the resilient arm tapers from less than about 0.1" to less than about 0.04" at t, with a radius of curvature r between about 0.55" and 0.6", with an overall height between one-fifth and one-third of an inch, and an overall length between about half and two-thirds of an inch. In the illustrated example, the thickness of the resilient arm 28 at the base 22 is about 0.08", and tapers to a thickness t of about 0.03", with a radius of curvature r of about 0.58" and overall height of about 0.25". The width of the arm 28 may be about 0.12", and its length about 0.52" in the plane of the base 22.

In a typical embodiment, the housing 20 is injection molded, and in such an embodiment a void 29 is formed behind the resilient arms 28 due to the molding process. As explained below, these voids 29 may serve as vents to improve air circulation within the interior space. Similarly, voids may be formed behind the tabs 32 and other locations in the base 22.

Figure 6:
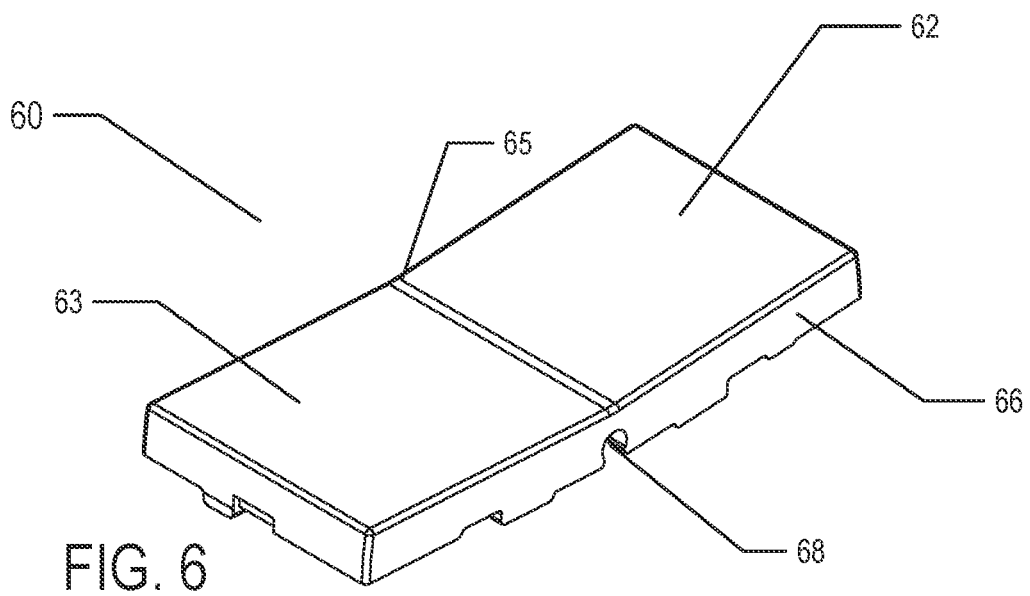
FIG. 6 is a perspective view of the shell of the switch assembly of FIG. 1.

The shell 60 is shown in FIG. 6. In the illustrated example, which is a rocker switch shell, the exterior surface comprises rectangular first and second oblique exterior surfaces 62, 63, which meet at an oblique angle at pivot axis 65. A sidewall 66 depends from the perimeter of the exterior surfaces, and is configured to fit within the sidewall 30 of the housing 20, permitting the sidewall 66 of the shell 20 to slide within the sidewall 30 of the housing 20. The sidewall 66 includes notches or recesses, as necessary, to accommodate any tabs 32 projecting from the inner surface of the sidewall 30. Additionally, a recess, aperture, or pocket 68 is provided on or in the sidewall 66 at the midpoint of the lateral portions of the sidewall, corresponding to the posts or lugs 34 projecting from the inner surface of the sidewall 30 of the housing 20. When the shell 60 is mounted on the housing 20, the shell 60 the illustrated recesses 68 snap fit over the posts 34, permitting the shell 60 to pivot along the axis 65.

Interior details of the shell 60 may be seen in FIGS. 9 and 10. FIG. 9 is a cross-sectional view of FIG. 8 taken along the plane indicated by C-C. FIG. 10 is an enlarged view of the region D in FIG. 9. Projections 72, such as posts or studs, project from the interior surface 70 of the shell 60, terminating in switch contact surfaces 74. These projections 72 are used to apply mechanical force to a corresponding switch component on the circuit board 40, as described below. Additionally, the transverse portions of the sidewall 66 of the shell each include an engagement surface 76 which is contacted by the corresponding resilient arm 28 when the shell 60 is mounted on the housing 20.

Figure 7:
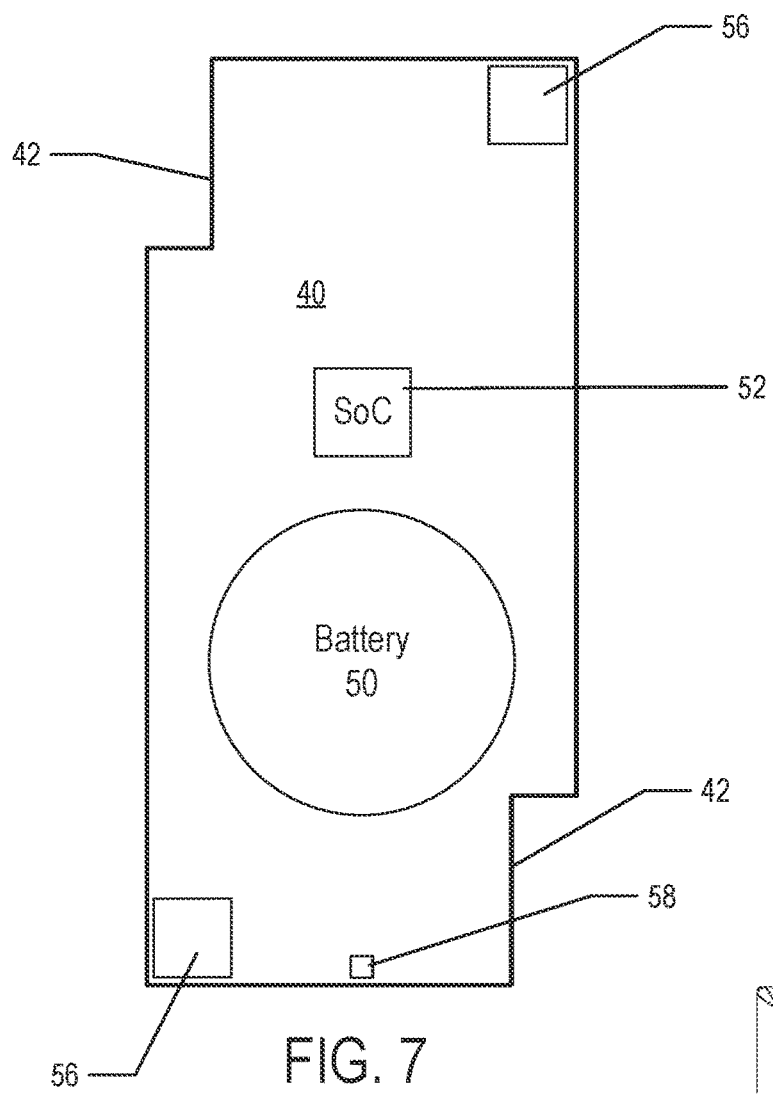
FIG. 7 is a schematic of a circuit board for use in the switch assembly of FIG. 1.

An example circuit board configuration can be seen in FIGS. 1 and 7, with select major components of the control circuitry of the switch depicted in FIG. 7. The circuit board 40 is shaped to fit on the base 22 of the housing 20, accommodating the projection of the resilient arms 28 from the base 22 into the interior space of the switch assembly, so that the resilient arms 28 can interact with the shell 60 without interference by the circuit board 40. In this example, cutouts or recesses 42 in the circuit board 40 allow the resilient arms 28 to project into the interior space.

Those skilled in the art will appreciate that the precise selection and arrangement of components on the circuit board 40—e.g., battery power source 50, power source interface (not shown in FIG. 7), microprocessor or controller, or system on chip 52, LED 58, and switches 56, and antenna (not shown), and other components—may vary from what is illustrated in the accompanying drawings, and depending on the intended use of the switch assembly, some components may be omitted and others may be added. In the illustrated example, two switches 56 are provided at opposite corners of the circuit board 40, but the switches 56 need not be provided at those particular locations; for example, they may be more centrally located on the circuit board 40, with the projections 72 on the interior of the shell 60 positioned to correspond to the switch locations.

In this example, the switches 56 are top-actuated tactile (tact) switches, with a top button 57, best seen in the perspective view of FIG. 1. Tact switches are electromechanical switches that generally provide haptic feedback to the user when actuated, and optionally audible feedback (such as a click sound). Tact switches may provide a desirable user experience, but other types of switches such as linear switches and optical switches may be used instead depending on the desired tactile effect and switch mechanism. Since switches of this type are employed, the projections 72 do not require a conductive contact surface, and can simply consist of molded plastic. Since the illustrated embodiment has a rocker switch configuration, two switches 56 are provided at opposite ends of the circuit board 40, corresponding to the respective projections 72 in the shell 60.

Figure 2:
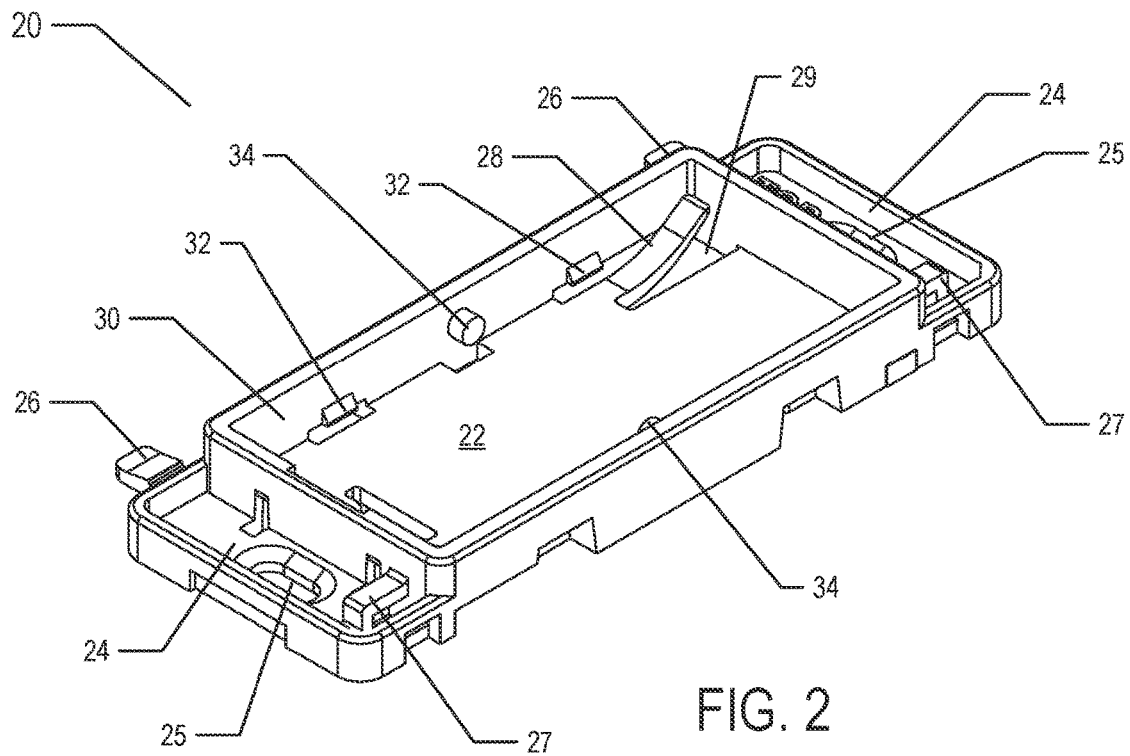
FIG. 2 is a perspective view of the housing of the switch assembly of FIG. 1.

Assembly of the switch assembly 100 is straightforward, as can be appreciated from FIG. 1. The circuit board 40 is mounted on the base 22 of the housing 20, with any cutouts or recesses 42 fitting around the resilient arms 28. If tabs 32 are provided to retain the circuit board 40 in place, the circuit board 40 may be snapped into place; as those skilled in the art will appreciate, a ramped surface on the entrance side of the tabs 32 (as illustrated in FIG. 2) reduces the effort required to snap the circuit board into place. In alternative embodiments, tabs 32 may not be required if the circuit board 40 and sidewall 30 are sized so that the circuit board may be press-fit in the housing 20, or if an adhesive is used. Next, the shell 60 is snapped into place so that the recesses, apertures, or pockets 68 in the sidewall 66 of the shell 60 engage the posts or lugs 34 on the sidewall 30 of the base 20. Once the shell 60 is mounted, the projections 72 of the shell 60 will be aligned with their corresponding switch component on the circuit board, and the engagement surfaces 76 will be aligned with the ends of the resilient arms 28. No separate spring component is required.

Referring to FIGS. 9 and 10, when the switch assembly 100 is in the neutral or disengaged position, the first and second oblique surfaces 62, 63 of the shell 60 are balanced, in that they project more or less the same amount from the housing 20, and the switch contact surfaces 74 are both spaced apart from and not engaging the top button 57 of their corresponding switches 56. When force is applied to the first oblique surface 62 by a user, the shell 60 pivots around its axis and the switch assembly moves to an actuating position, in which the switch contact surface 74 on the interior of the first oblique surface 62 contacts and depresses the button 57 of the corresponding switch 56. The tip of the resilient arm 28 is in contact with the engagement surface 76 at the end corresponding to the first oblique surface 62. As the shell 60 pivots, the tip of the resilient arm 28 may slide along a ramp of the engagement surface 76 until further travel is blocked, which reduces the force applied to the surface 62. The resilient arm 28, in the meantime, is deflected due to the force applied to by the engagement surface 76. In the embodiment illustrated in the accompanying drawings with the dimensions set out above, the end of the resilient arm 28 may travel about 0.1" under normal application of force. The resisting force of the resilient arm 28 preferably, due to its configuration, increases as the tip of the arm continues to travel under the influence of the applied force. The resulting tactile response to the user may thus emulate the feel of a switch with a silicone spring, such as that described in U.S. Pat. No. 9,401,252, without the need for the additional parts required by that design. When the force applied to the first oblique surface 62 is removed, the resilient arm 28 pushes against the engagement surface 76, returning the shell 60 to the disengaged position.

Similarly, when force is applied to the second oblique surface 63, the switch 60 moves to another actuating position in which the button 74 of the corresponding switch 72 is depressed and the corresponding resilient arm 28 is deflected, and when the applied force is removed, the resilient arm 28 returns to its original position, pushing the shell 60 back to the disengaged position. In the disengaged position, both resilient arms 28 may be in contact their respective engagement surfaces 76, maintaining the switch 60 in the disengaged position. Thus, the resilient arms 28 can be used to maintain the shell 60 in the neutral, disengaged position. The forces applied to the circuit board 40 are minimized, because the projections 72 contact only the top buttons 57 of the tactile switches 56. The resilient arms 28 are part of the housing 20, projecting from behind the circuit board 40; no force or pressure is exerted on the circuit board 40 to return the shell 60 to the disengaged position. The stiffness of the resilient arms 28 can also control the maximum travel of the shell 60 when force is applied to the first or second oblique surfaces 62, 63, ensuring that the projections 72 do not depress the buttons 57 any farther than necessary and do not damage the switches 56.

In the illustrated example of a rocker switch, the shell 60 is designed to actuate two separate switches on the circuit board 40 near opposite ends of the housing 20, with a pivot axis located at the midpoint of the shell 60. Therefore, similar features (resilient arms 28, projections 72, engagement surfaces 76, etc.) are provided at or near each end of the housing 20 and shell 60, as the case may be. However, in other embodiments, the switch assembly 100 may comprise only one switch 56, in which case the pivot axis may be located in a different position (e.g., closer to one end of the shell/housing, while the switch is located closer to the other end) and only one resilient arm 28 may be necessary. Those skilled in the art will appreciate that the resilient arm 28 and housing/shell design may be adapted for use in a plate switch or push-button switch, rather than a rocker switch.

The voids 29, as mentioned above, may also serve as vents permitting air flow through the switch assembly 100. This may be useful where the switch assembly is used in an intermittently humid environment (such as a laundry room, kitchen or bathroom) since it may mitigate moisture buildup in the switch assembly 100, instead of requiring an additional manufacturing step of sealing the switch assembly 100 to be moisture-resistant. If the voids 29 are not created as a result of the molding process, other vents may be included in the housing 20.

Figure 11:
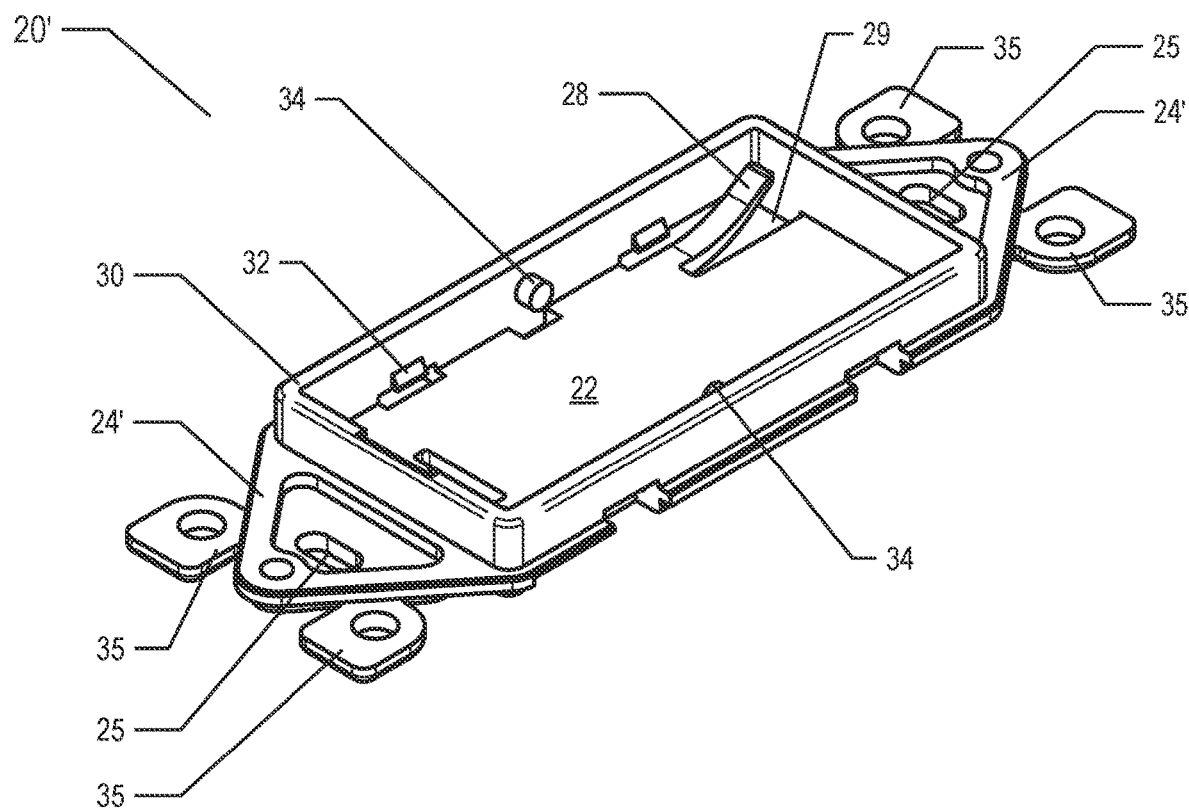
FIG. 11 is a perspective view of an another example of the housing of the switch assembly.

If the switch assembly 100 is to be mounted under a switch plate 10, it may be sized so that the housing 20 fits under the switch plate when it is mounted on a wall or surface with the sidewall 30 protruding through the switch plate aperture. The switch assembly 100 may be configured to be mounted under a typical, commercially available switch plate as well, such as a Leviton Decora® brand rocker faceplate from Leviton Manufacturing Co., Inc., New York, USA. An example alternate embodiment of the housing 20' is shown in FIG. 11 for use under such a Decora® faceplate is shown in FIG. 11. While the base 22, sidewall 30, resilient arms 28, voids 29 and tabs and lugs 32, 34 may be generally as described above, the end portions 24' may vary in dimension and configuration according to the available space beneath the faceplate. In this example, the ends 24' include ears 35 with additional screw bores for mounting.

Thus, the switch assembly 100 may be mounted in any location on a wall or other surface under a switch plate, without requiring an electrical box or cutout in the wall to accommodate any switch components.

The examples and embodiments described herein thus provide an apparatus, system, and method of assembly for a wall- or surface-mounted assembly for controlling other devices or fixtures. It should be understood that this description is not intended to be limiting, and that the examples contemplated herein include all alternatives, modifications, and equivalents as would be appreciated by the person skilled in the art, and are included within the scope of the accompanying claims. Although the features and elements various examples or embodiments may be described as being in particular combinations, each feature or element can be used alone, without the other features and elements of the embodiments, or in various combinations with or without other features and elements disclosed herein. For example, switch assembly described above need not be used specifically for wireless control, in which case the antenna and transmitted may be omitted.

Throughout the specification, terms such as "may" and "can" are used interchangeably and use of any particular term should not be construed as limiting the scope or requiring experimentation to implement the claimed subject matter or embodiments described herein. Further, the various features and adaptations described in respect of one example or embodiment in this disclosure can be used with other examples or embodiments mentioned herein, as would be understood by the person skilled in the art.

A portion of the disclosure of this patent document contains material which is or may be subject to one or more of copyright, design patent, industrial design, or unregistered design protection. The rights holder has no objection to the reproduction of any such material as portrayed herein through facsimile reproduction of the patent document or patent disclosure, as it appears in the Patent and Trademark Office patent file or records, but otherwise reserves all rights whatsoever.

The invention claimed is:

1. A switch assembly, comprising:
a housing comprising a base and a sidewall defining an interior space, the base comprising a planar surface for mounting on another planar surface;
a shell mounted to the housing, the shell comprising an interior switch contact surface, the shell cooperating with the base and sidewall of the housing to enclose the interior space;
circuitry including a switch comprised in the interior space;
a resilient arm unitary with the base, the resilient arm projecting from the base and from behind the circuitry into the interior space;
the shell movable from a disengaged position to an actuating position in response to force applied to an exterior of the shell, the interior switch contact surface actuating the switch in the actuating position, the resilient arm configured to engage the shell in the actuating position to return the shell to the disengaged position.

2. The switch assembly of claim 1, wherein the switch comprises a mechanical switch.

3. The switch assembly of claim 2, wherein the switch is a linear switch or a tactile switch.

4. The switch assembly of claim 1, wherein the switch assembly is a wireless switch assembly.

5. The switch assembly of claim 4, wherein the circuitry further comprises an internal power source interface, a microprocessor controlling a wireless transmitter, and an antenna.

6. The switch assembly of claim 5, wherein the circuitry further comprises a battery power source.

7. The switch assembly of claim 4, wherein the switch assembly is configured to fit between a wall or other flat surface and a switch plate.

8. The switch assembly of claim 7, wherein the switch plate is a conventional wallplate.

9. The switch assembly of claim 7, wherein the base comprises mating attachments for connecting a plurality of switch assemblies side by side.

10. The switch assembly of claim 1, wherein the resilient arm comprises at least one of the following characteristics:
a thickness of the resilient arm decreases from the base of the housing to a tip of the resilient arm; and
the resilient arm curves from the base of the housing to the tip of the resilient arm.

11. The switch assembly of claim 1, wherein the resilient arm undergoes deformation or deflection when the shell is moved to the actuating position, and the interior switch contact surface undergoes substantially no deformation or deflection on contacting the switch.

12. The switch assembly of claim 1, the shell comprising a sidewall, the resilient arm configured to engage an engagement surface of the sidewall of the shell to return the shell to the disengaged position.

13. The switch assembly of claim 1, wherein the interior switch contact surface is provided on a projection extending from an interior surface of the shell.

14. The switch assembly of claim 1, wherein the interior switch contact surface is integral with the shell.

15. The switch assembly of claim 1, the housing further comprising vents permitting airflow through the interior space.

16. The switch assembly of claim 1, wherein the shell comprises first and second interior switch contact surfaces and the circuitry including corresponding first and second switches.

17. The switch assembly of claim 16, the housing comprising first and second resilient arms positioned at opposite ends of the base, and the circuitry comprising first and second switches positioned at opposite ends of the base,
the shell movable from the disengaged position to a first actuating position in response to force applied to a first portion of the exterior of the shell and from the disengaged position to a second actuating position in response to force applied to a second portion of the exterior of the shell,
the first interior switch contact surface actuating the first switch in the first actuating position and the second interior switch contact surface actuating the second switch in the second actuating position,
the first resilient arm configured to engage the shell in the first actuating position to return the shell to the disengaged position and the second resilient arm configured to engage the shell in the second actuating position to return the shell to the disengaged position.

18. The switch assembly of claim 17, wherein the shell comprises a rocker switch shell comprising first and second oblique walls meeting at a pivot axis, the shell pivotably mounted to the housing at the pivot axis, the first and second interior switch contact surfaces being provided on an interior of the first and second oblique walls.

19. The switch assembly of claim 18, wherein the first and second interior switch contact surfaces are provided on first and second projections extending from an interior surface of the first and second oblique walls.

20. The switch assembly of claim 1, wherein the circuitry is provided on a circuit board, and the resilient arm projects from behind the circuit board and into the interior space above the circuit board.

* * * * *